ABSTRACT OF THE DISCLOSURE

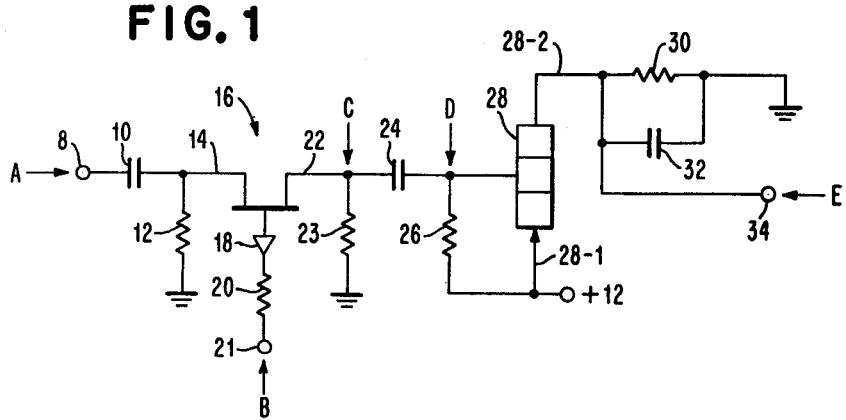
FIG. 1
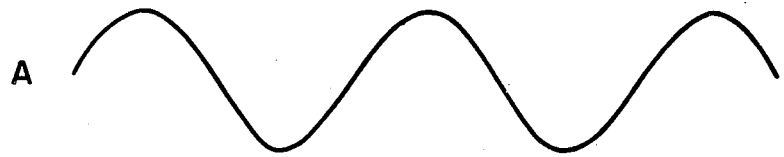
A
B
C
FIG. 2
D
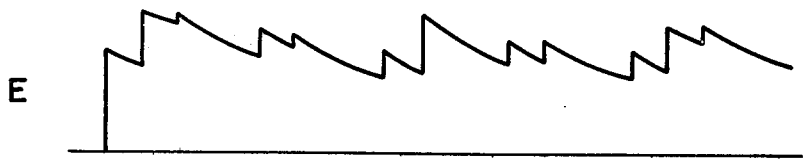
E
INVENTORS
PAUL ABRAMSON
WALTER K. FRENCH
BY John J. Goodwin
ATTORNEY 3,495,097
SIGNAL DETECTOR CIRCUIT
Paul Abramson, Yorktown Heights, and Walter K. French, Montrose, N.Y., assignors to International Business Machines Corporation, Armonk, N.Y., a corporation of New York
Filed Sept. 14, 1967, Ser. No. 667,837
Int. Cl. H03k 5/20
U.S. Cl. 307—235
5 Claims

The disclosure relates to a circuit for detecting low frequency sine wave signals. The input sine wave signal to the circuit is chopped by a higher frequency square wave signal resulting in a series of discrete pulses having amplitudes which vary in accordance with the amplitude variation of the input sine wave signal. The varying amplitude pulses are differentiated, producing a series of varying amplitude alternating positive and negative narrow spike pulses. Either the positive or the negative spike pulses are smoothed by an integrating circuit or filter. In the present disclosure, the negative spike pulses are amplified and integrated to provide an indication of the amplitude of the input sine wave signal.

BACKGROUND OF THE INVENTION

Field of the invention

The present invention is related to the signal detector art and more particularly to the class of circuits which detect the presence of a signal and give an indication of the signal amplitude.

SUMMARY OF THE INVENTION

The present invention relates to a device which detects relatively low amplitude sine wave signals even when as little as only one-half cycle of signal appears. An output signal is produced indicative of the amplitude of the input sine wave signal. The significant feature of the invention is that the input sine wave signal is chopped into a series of pulses which alternate positively and negatively in accordance with the sine wave. Thus, for positive half cycles and for negative half cycles of the sine wave signal, the chopped pulses contain positive going portions and negative going portions. When differentiated, the positive going portions of both the positive and negative cycles result in a series of positive going spikes for both the positive and negative cycles of the sine wave signal. Likewise, the negative going portions of both the positive and negative cycles result in a series of negative going spikes for both the positive and negative cycles of the sine wave signal.

The foregoing and other objects, features and advantages of the invention will be apparent from the following more particular description of a preferred embodiment of the invention, as illustrated in the accompanying drawing.

BRIEF DESCRIPTION OF THE DRAWING

In the drawing:
FIG. 1 is a schematic illustration of an embodiment of a detection circuit in accordance with the principles of the present invention.
FIG. 2 is a series of waveform drawings which illustrate the operation of the embodiment of FIG. 1.

DESCRIPTION OF THE PREFERRED EMBODIMENT

Referring to FIG. 1, a full wave detector circuit is shown including an input capacitor 10, connected between an input terminal 8 and a load resistor 12. The input capacitor 10 is connected to the source side 14 of the field effect transistor 16. The gate 18 of the field effect transistor is connected through a resistor 20 to ground potential. The drain side 22 of the field effect transistor 16 is connected to a differentiating circuit consisting of capacitor 24 and resistor 26. The output of the differentiating circuit is connected to the base 28–3 of PNP transistor 28. The emitter 28–1 of the transistor is connected to a positive battery potential which in the present embodiment is plus 12 volts. The transistor 28 functions as a diode and amplifier, passing only the negative spikes of the signal from the differentiating portion of the circuit. An integrating or smoothing circuit consisting of resistor 30 and capacitor 32 in parallel is connected between the collector electrode 28–2 of transistor 28 and ground potential. An output terminal 34 is also connected to collector electrode 28–2 and in the absence of an input signal at input terminal 8, the potential at output terminal 34 will be zero volts.

A more detailed explanation of the circuit of FIG. 1 will be given with reference to the waveforms appearing in FIG. 2. The sine wave A of FIG. 2 is applied at terminal 8 of the circuit and is connected through capacitor 10 which removes any DC level. The waveform A, therefore, also appears at the source side 14 of field effect transistor 16. Field effect transistor 16 is essentially a gating device. When the potential at the gate portion 18 is at a given level which is more positive than the potential at the source, the resistance of the transistor is very high and no signal passes from the source 14 to the drain 22, the input signal being conducted to ground via resistor 12. When the potential at the gate 18 falls below the given positive level with respect to source 14, the resistance of the gate becomes very low and there is essentially a short circuit between source 14 and drain 22.

A series of square wave chopping signals depicted as waveform B in FIG. 2 is applied to terminal 21. For each pulse of waveform 2B, the gate field effect transistor 16 is not energized and no portion of waveform 2A passes to drain 22. At the zero portion of waveform 2B, the gate field effect transistor 16 is energized and a segment of waveform 2A corresponding in time duration to the zero portion of waveform 2B is passed to the drain 22. Thus, a signal as depicted by waveform C of FIG. 2 appears across the resistor 23.

The signal of waveform 2C is applied to a differentiating circuit consisting of capacitor 24 and resistor 26. The differentiating circuit produces a spike pulse for each positive going and negative going change of polarity of the signal represented by waveform 2C. Both the positive and negative cycles of waveform 2C contain both positive and negative going polarity changes. Thus, a differentiating signal is produced which has a series of positive spikes representing both the positive and negative cycles of the sine wave signal and a series of negative spikes also representing both the positive and negative cycles of the chopped sine wave signal 2C. The output of differentiating circuit is shown as waveform D in FIG. 2. The signal represented by waveform 2D is applied to the base of PNP transistor 28. Transistor 28 functions as a diode, that is, it conducts only in response to the negative spikes of waveform 2D. When transistor 28 conducts in response to the negative spikes of the signal represented by waveform 2D, the collector electrode 28–2, which is normally at zero volts, goes in a positive direction by an amount proportional to the amplitude of the spike of waveform 2D being applied to transistor 28. Thus, the potential at collector 28–2 varies between zero volts and some positive voltage as determined by the amplitude of the negative spikes of the signal represented by waveform 2D. The signal on collector 28–2 is averaged or smoothed by the resistor 30 and the capacitor 32, resulting in an output signal at terminal 34 as represented by waveform E of FIG. 2. Waveform 2E is a quasi full wave rectified version of the input sine wave signal 2A. It is a representation of the rectified amplitude of waveform 2A but does not provide a representation of the power. It is noted that the chopping and differentiating of the waveform signal 2A results in both positive and negative pulses for each half of the waveform. Thus, the presence of as little as one-half cycle of the since wave, regardless of phase, may be detected by the circuit of FIG. 1. Another important feature of the circuit of FIG. 1 is that it does not require any transformers and therefore the circuit may readily be fabricated as an integrated circuit.

While the invention has been particularly shown and described with reference to a preferred embodiment thereof, it will be understood by those skilled in the art that various changes in form and details may be made therein without departing from the spirit and scope of the invention, for example, transistor 28 may be an NPN type which conducts in response to the positive spikes of waveform D.

What is claimed is:

1. A detection circuit for bi-polar signals comprising:
   means for chopping said bi-polar signal for producing a sequence of bi-polar pulses,
   means for differentiating said bi-polar pulses for producing a sequence of bi-polar spike pulses, and
   means for smoothing said bi-polar spike pulses of one selected polarity into an output signal having an amplitude level representative of the amplitude of said bi-polar signal.

2. A sine wave signal detection circuit comprising:
   means for chopping said sine wave signals for producing a sequence of discrete pulses for each half cycle of said sine wave, said pulses being positive for positive half cycles of said since wave and negative for negative half cycles of said sine wave,
   means for differentiating said sequence of discrete pulses for producing a sequence of alternating positive and negative spike pulses for each half cycle of said sine wave, and
   means for smoothing said spike pulses of one selected polarity for producing an output signal having an amplitude level representative of the amplitude of said sine wave signal.

3. A sine wave signal detection circuit according to claim 2 wherein said means for chopping said sine wave signal includes a field effect transistor having a source connection, a drain connection, and a gate connection, and a source of chopping signal connected to said gate connection, said sine wave signal being applied to said source connected of said field effect transistor and portions of said sine wave signal being gated to said drain connection by said chopping signal applied to said gate connection.

4. A sine wave signal detection circuit according to claim 2 wherein said sequence of discrete pulses for each half cycle of said sine wave signal, each have a positive going leading edge and a negative going trailing edge for positive half cycles of said sine wave, and a negative going leading edge and a positive going trailing edge for negative half cycles of said sine wave, and
   wherein said differentiating means produces positive spike pulses for positive going edges of said gated portions of said sine wave and negative spike pulses for negative going edges of said gated portions of said sine wave.

5. A sine wave signal detection circuit according to claim 2 wherein said smoothing circuit includes a transistor having emitter, base, and collector electrodes, said base electrode connected to said differentiating circuit, said transistor conducting in response to said spike pulses of one selected polarity, and
   a resistor and capacitor connected in parallel to one of said transistor electrodes for integrating the signal conducted by said transistor.

References Cited

UNITED STATES PATENTS

| | | | |
|---|---|---|---|
| 2,510,129 | 6/1950 | Moore | 328—31 |
| 3,327,133 | 6/1967 | Sickles | 307—240 X |
| 3,411,018 | 11/1968 | Dapper et al. | 307—235 |

DONALD D. FORRER, Primary Examiner

R. C. WOODBRIDGE, Assistant Examiner

U.S. Cl. X.R.

307—240, 251, 304; 328—151